Figure 4:
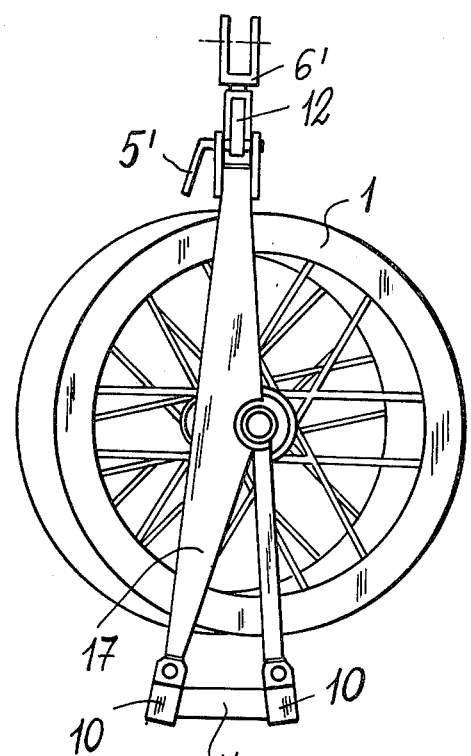

United States Patent [19]

Betta

[11] 4,201,369
[45] May 6, 1980

[54] PULLEY ARRANGEMENT FOR THE LAYING OUT OF ELECTRICAL LEADS IN A BUNDLE FASHION

[75] Inventor: Walter Betta, Bergamo, Italy

[73] Assignee: WABING S.r.L., Bergamo, Italy

[21] Appl. No.: 944,610

[22] Filed: Sep. 21, 1978

[30] Foreign Application Priority Data

Oct. 7, 1977 [IT] Italy ............................ 4219/77[U]

[51] Int. Cl.² ............................................. B66D 1/36
[52] U.S. Cl. ............................ 254/193; 254/134.3 PA
[58] Field of Search ............................ 254/192–197, 254/198, 155, 188, 190 R–190 D, 134.3 PA; 242/68.6, 157 R

[56] References Cited

U.S. PATENT DOCUMENTS

| | | | |
|---|---|---|---|
| 47,558 | 5/1865 | Luck | 254/193 |
| 805,760 | 11/1905 | Tarbox | 254/192 |
| 1,570,271 | 1/1926 | Minor | 254/192 |
| 1,573,945 | 2/1926 | Minor | 254/192 |
| 1,855,251 | 4/1932 | Marzolf | 242/68.6 |
| 2,382,049 | 8/1945 | Frankhouser | 254/193 |

Primary Examiner—John M. Jillions

[57] ABSTRACT

A pulley arrangement for the laying out of electrical leads in a bundle fashion is disclosed. The arrangement comprises a pulley supporting framework having a suspension hook and at least one wheel in said framework. The arrangement further includes two transversely interconnected base supporting beams having alternate pivoting locations for pulley supporting elements, two sides at the ends of the beams and an upper beam or crosspiece connected to the top of the sides with elements for removably fastening thereof to the sides and a plurality of holes on the upper beam or crosspiece for the connection of the pulley supporting sides in optional combination of preset pulley series with the central pins connected to one another and to the sides.

3 Claims, 6 Drawing Figures

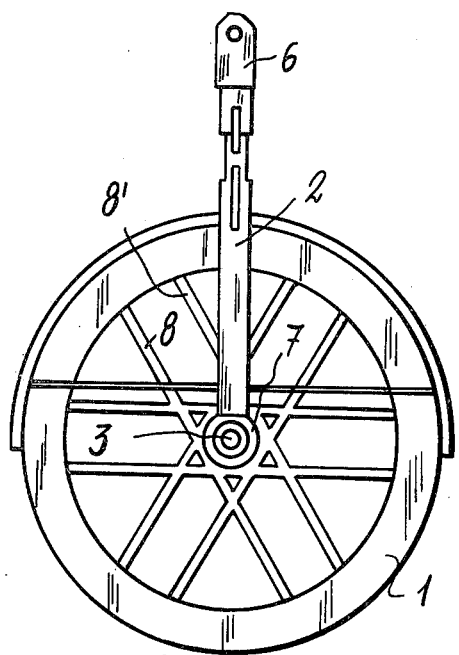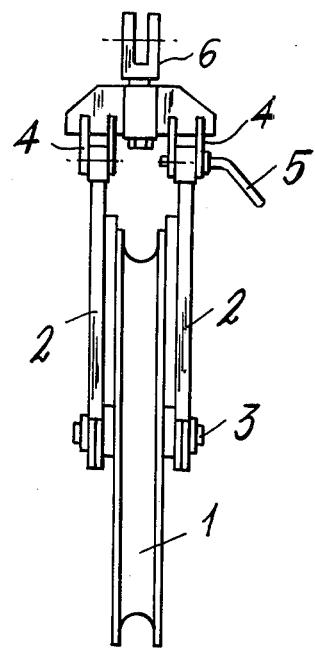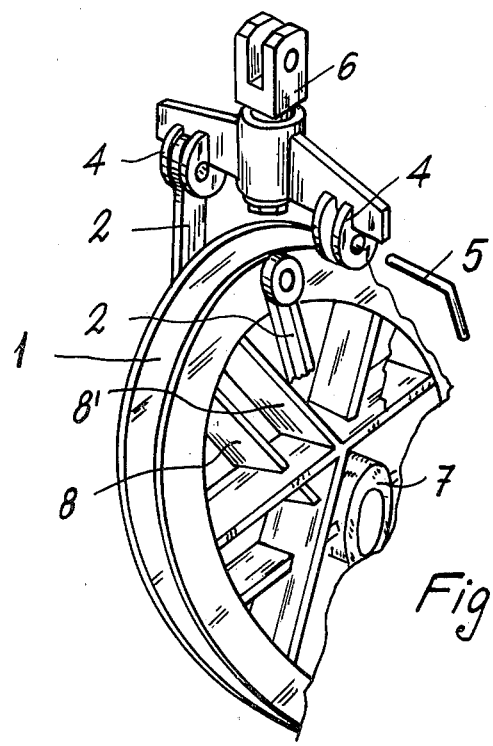

PULLEY ARRANGEMENT FOR THE LAYING OUT OF ELECTRICAL LEADS IN A BUNDLE FASHION

This invention relates to a pulley arrangement for the laying out of electrical leads in a bundle fashion, having at least one pulley arranged on a frame with the possibility of combining a plurality of pulleys on the bearing frame.

As well known, when designing high voltage, long-distance lines, provision is commonly made of a plurality of leads for each phase in order to increase the efficiency of the current transport.

For lead assembling pulleys are used, that is special wheels provided with a frame, serving to support the leads so as not to crawl on the ground during laying out operations.

At present different pulleys are used depending on the number of leads to be assembled for each phase, since the solution is often adopted of installing the whole assembly of leads for each phase by using a single pulling rope. Therefore, at present there are commercially available such pulleys as intended for use with one, two, three or four leads, thus binding firms involved in different works to bear high burdens in purchasing and storing the various types of pulley groups.

It is the object of the present invention to provide a pulley arrangement of simple and inexpensive construction, which can be transformed and combined without any difficulty at all to any of the required types, thus avoiding the above mentioned drawbacks.

It is another object of the present invention to provide a pulley arrangement for the aforesaid purposes, having a plurality of pulleys for a plurality of leads for each phase, the pulleys being combinable with one another, it being provided that the wheels of the pulley group are alternately offset in the transverse plane.

It is another object of the invention to provide a pulley arrangement, wherein each of the individual pulley wheels have spokes arranged with the largest strength section on the transverse plane both inclined in the longitudinal and transverse planes to provide the largest strength under same weight conditions.

An advantage of the arrangement according to the present invention consists of having, as herein previously mentioned, a strong light base pulley which can be combined in a series of pulleys depending on the number of leads in the electric line.

As the central wheel of one group is displaced in the pulling direction, another advantage of the invention consists of considerably reducing the required stress because of the increase in the wheel diameter.

Figure 5:
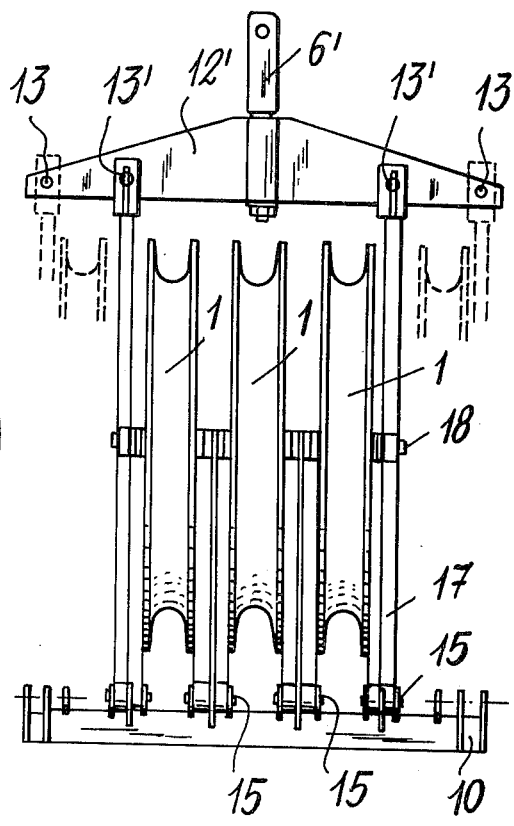
Figure 6:
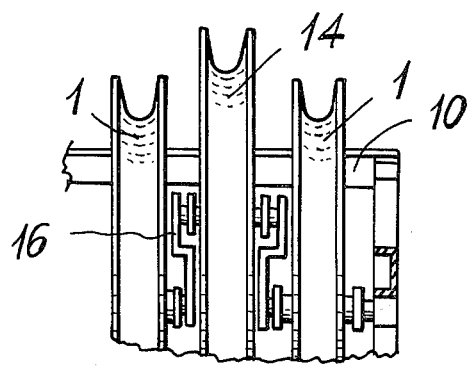

These and further objects, features, peculiarities and advantages of the arrangement according to the present invention will become more apparent to those skilled in the art from the following short detailed description of an unrestrictive embodiment, when considered in connection with the accompanying drawings, in which:

FIGS. 1 to 3 show several views of a base pulley in accordance with the invention; and FIGS. 4, 5 and 6 show several views of a group or unit as obtained by using basic pulleys according to FIGS. 1 to 3.

Referring now to the accompanying drawings, and particularly to FIGS. 1, 2 and 3, it will be seen that the basic element of the arrangement according to the invention comprises a single wheel pulley 1 having a fork frame supporting the wheel pin 3. The top portion of fork 2 is connected to the two supporting arms by means of cylindrical hinges herein denoted at 4, of which one is provided with a handle 5, so that it can be readily slipped off by opening the frame and causing one of the arms of fork 2 to rotate (see FIG. 3), so as to remove the lead at the end of the laying out operation.

The connecting hook 6 for the pulley is provided as rotable about a vertical shaft to facilitate the connection to any type of clamp.

Wheel 1 is made of light alloy and comprises a hub 7 accomodating the seat for a steel sleeve having the ball bearings mounted therein for a free rotation about said fixed pin 3.

According to the invention said hub 7 has spokes 8 connected thereto, these spokes 8 being transversely inclined and crossed to one another (as better shown in FIG. 3), which affords a higher strength and substantial stiffening under same weight conditions.

The basic pulley described in connection with FIGS. 1 to 3 can be used for the assembling of leads on electric lines having only one lead for each phase.

For simultaneously laying out a plurality of leads by means of a single pulling rope or cable, use is made of an assembly of basic pulleys combinable to one another in any number, as it will now be better described in connection with FIGS. 4, 5 and 6.

As it will be seen, a frame is now provided as formed of a base including two steel beams 10 braced to each other by sturdy connections 11, on which the previously described simple pulleys 1 are mounted, from which the connecting cross-piece provided between the two upper arms 2 has been removed. They are mounted on beams 10 by pins 15 alternatively one pulley on one beam 10 and the adjacent pulley on the other beam, also interconnecting the projecting ends of central pins 18, having the wheels mounted thereon by means of link rods 16.

Such groups or units as formed are bound together by two sides 17 which in turn are interconnected by a crosspiece 12 with a central hook 6' rotating on a vertical axis of a similar type as hook 6 mounted on the crosspieces of the above described simple pulleys. Fastening to the cross-pieces is accomplished by a respective handle 5' similar to handle 5 and accordingly of removable type.

Crosspieces 12 have two series of drilled holes 13 and 13' to make up groups comprising three or five wheels (FIG. 5).

The three-wheel groups will be used for the simultaneous laying out of two or three leads by only one pulling rope or cable, and five-wheel groups for the laying out of four leads still by a single pulling rope or cable.

The particular arrangement of the wheel groups obtained by effecting the series of described connections facilitates the passage thereon for the element connecting the pulling rope or cable to the leads. Thus, should the pulley be oriented in the pulling direction with the central wheel 14 (FIG. 6) for the three wheel case, at the passage of the element connecting said pulling rope or cable to the leads, and since the pulling rope or cable weighs on the central wheel and the leads weigh on the side wheels, at that instant the whole unit behaves as a wheel having a substantial diameter.

Now, since the passage of a rigid body on a wheel is comparable with the movement of a body on an inclined plane. Therefore, the required stress will be as lower as small is the angle that it forms with the horizontal, that is to say as large is the diameter of the wheel.

What is claimed is:

1. A pulley system for the laying out of electrical leads, wherein the number of pulleys assembled is equal to the number of electrical leads to be laid out, and comprising:

at least one pulley subassembly, said subassembly consisting of a pulley having a hub and having a central pin forming an axle, and further consisting of two support arms attached at one end to opposite ends of said central pin so as to extend parallel to the radius of said pulley, each arm having a hole in its free end;

a support beam subassembly, consisting of two parallel beams which are transversely connected, each beam having a plurality of holes for pin connection to the free ends of the support arms of said pulley subassembly, said pin connection holes on the beams being spaced at multiples of the width of said pulley subassembly such that alternate pairs of pulley support arms are connected alternately to one beam and to the other in staggered fashion such that each said pulley is positioned parallel to a single plane and transverse to the plane containing said parallel beams;

an upper cross piece having a swivelling central fixture for attachment to a lifting line and having holes spaced at multiples of the pulley width, one pair of said holes being spaced for connection with said support arms of a single pulley subassembly;

two side plates having holes at each end for attachment to said support beams and to said upper cross piece respectively; and pins for connecting said support arms and said side plates, the central pin of each said pulley being connected to the central pin of the adjacent pulley and the central pins of the outermost pulleys being connected to said side plates when more than one pulley is used.

2. A pulley system according to claim 1, wherein the said central pins of the pulleys are connected to each other by link rods, producing a staggered arrangement of the pulley axes in a plane parallel to the plane containing the said two support beams.

3. A pulley system according to claim 1, wherein the said pulley wheels have spokes which originate tangentially to said hub, in alternating directions, so that said spokes are crossed and are braced by each other, and in which the width of the spokes in the direction transverse to the plane of the pulley exceeds the thickness of the spokes in any dimension in the plane of the pulleys.

* * * * *